United States Patent Office 3,179,082
Patented Apr. 20, 1965

3,179,082
EXPANSION BOLTS
William G. B. McClean, 66 4th Ave., Johannesburg,
Transvaal, Republic of South Africa
Filed Aug. 8, 1962, Ser. No. 215,736
Claims priority, application Republic of South Africa,
Dec. 15, 1961, R–61/1,225; Aug. 22, 1961, R–61/2,883;
Sept. 5, 1961, R–61/1,383
11 Claims. (Cl. 116—114)

This invention relates to visual warning devices for indicating loss to tension in bolts.

While it is applicable to bolts used for connecting two or more members, e.g. structural members, together, the invention is primarily concerned with bolts which are anchored in a rock, concrete or other face. Bolts of this nature are commonly used in mining operations for roof-bolting and they are, of course, also employed to secure machinery and other equipment to a foundation. These so-called anchor bolts are either grouted into their sockets in which case the projecting portion of the shank is threaded for reception of a nut, or they may be of the expansion type which includes a shell member consisting of complementary elements which are movable relative to one another to lock the bolt in its socket by a wedging action. Expansion bolts may either be provided with an integral head or the shank may be threaded to receive nuts.

It is an object of the invention to provide a simple device by means of which a visual warning will be given in the event of a bolt, especially an anchor bolt, having worked loose.

It is a further object to provide a device by means of which a visual warning will be given if the load-carrying capacity of an anchor bolt becomes reduced, even though the bolt itself has not worked loose in its socket. In this connection, it is explained that in mining operations the rock section in which the bolt is embedded sometimes moves bodily with the result that although the bolt does not actually work loose in its socket, its load-carrying capacity is reduced.

Where an expansion bolt is provided with an integral head and locking is effected by applying torque with a wrench engaging the head, it is comparatively easy to apply too great a leverage and shear the bolt.

It is accordingly still another object of the invention to provide for use with the devices of the invention means whereby a strictly limited torque may be applied to a bolt of this type to start the shell, whereafter the bolt can be drawn bodily outwards relative to its socket to effect locking.

In accordance with the invention, a visual warning device for indicating loss of tension in a bolt comprises a warning element disposable in lateral spaced relationship to the bolt and resilient means mountable concentrically on a projecting portion of the bolt shank and located between the shank and the warning element, said resilient means being adapted to expand radially outwards to engage and retain the warning element when a desired pressure in an axial direction is applied to it on tightening down.

The warning element may conveniently be in the form of a collar. Alternatively, a plunger or the like may be employed which is retained by the resilient means in a normal or safe position. When the retaining force is removed, the warning element is free to assume or to be displaced into a warning position.

The resilient means may assume a variety of different forms. It may, for example, comprise a coil spring having one or more spring steel strips disposed longitudinally on the outside of the coil and secured, for example, to the respective extremities of the coil. Two such spring steel strips disposed 180° apart may conveniently be used. A sleeve member mounted on the exposed portion of the bolt shank inside the coil spring will be used with this embodiment, said sleeve member being formed or associated with a flange at its outer end which acts as a bearing surface for the bolt head or for a nut, as the case may be. The overall length of the coil spring is somewhat greater than the length of the sleeve member excluding the flanges and when the bolt or nut thereon is tightened down against the outer face of the flange, the coil spring is compressed and the spring steel strips are caused to bow outwards in a radial direction between their points of connection to the coil. The radial force thus exerted serves to retain the warning element in a normal or safe position. If the bolt works loose, the spring steel strips will tend to assume an unbowed position and the grip which they exerted on the warning element will be relaxed to allow the said element to assume a warning position. This it may do under the influence of gravity if the bolt extends downwards. But if the bolt extends upwards or if it is horizontal, auxiliary spring means may be employed to displace or eject the warning element once the frictional retaining force has been removed.

It will be understood that since the length of the coil spring is somewhat greater than that of the sleeve member, it will always be exerting a force when the inner end of the sleeve member is incapable of further inward movement.

The resilient means may also take the form of a cage member comprising a plurality of preferably symmetrically arranged spring steel strips disposed between a pair of spaced annular rings to which they are secured. Here again, the overall length of the cage member is somewhat greater than that of the sleeve member and it is mounted over the sleeve member so that when the bolt is tightened down, the strips will bow outwards and exert a frictional retaining force on the warning element.

In another embodiment, a pair of annular members may be mounted on the exposed portion of the bolt shank. These annular members define between them a continuous or interrupted peripheral groove of V or other divergent section. A ring which is deformable in a radial direction, such as a garter spring, is located in the groove. When the annular members are urged relatively towards one another on tightening down, the ring is compressed between the faces of the annular members defining the groove to expand radially outwards to engage the warning element.

In another embodiment, at least one of the annular members is cup-shaped, and the space within the cup or cups is occupied by a helical spring mounted co-axially on the bolt. In this case, when the annular members are urged towards one another, the helical spring is compressed and remains under compression with the warning element in place.

This embodiment is of particular value since the element will be free to assume a warning position if the loading which can safely be taken by the bolt falls below the force exerted by the compressed spring. As indicated above, it is possible for this to happen even if the bolt itself does not work loose.

It will be understood that the overall length of the uncompressed helical spring will, in the absence of packing washers or the like, be such that it becomes compressed to the desired extent before the ring exercises its retaining influence on the warning element.

The inner face of the inner annular member may be shaped as may be required to accommodate itself to any element such as a domed washer which may, if desired, be placed on the projecting portion of the bolt and caused to abut against a rock or other face.

Reference has been made earlier in this specification to the risk that an expanding bolt having an integral head may be sheared by the application of too great a torque.

To obviate this disadvantage, the shank of the bolt is in the form of a stud and a nut and a locknut are provided on a threaded portion thereof. The nut and locknut are so constructed that one of them will fail before the other after a predetermined torque has been applied to the stud by means of a spanner or like tool engaged with one of the nuts to urge them relatively together.

It will be understood that until failure of the one nut takes place, the two nuts act together in the same manner as an integral bolt head by means of which torque can be applied to the stud. After failure, the intact nut is employed to draw the stud bodily outwards relative to the socket to increase the wedging action of the shell and so lock the bolt firmly in place.

If desired, a washer may be interposed between the two nuts although if the diameter of the socket is smaller than the diameters of the nuts the use of a washer will not be essential.

To provide for selective failure of one of the two nuts, they may be made of different materials. For example, one nut may be made of steel and the other of brass, the relative sizes and number of threads being such that the brass nut will fail first. Alternatively, or additionally, the one nut may simply have a greater number of threads than the other so that the nut having the smaller number of threads will strip first.

In order that the invention and the manner in which it is to be performed may be fully understood, various embodiments will now be described, purely by way of example, with reference to the accompanying drawings, in which.

Figures 1, 2:
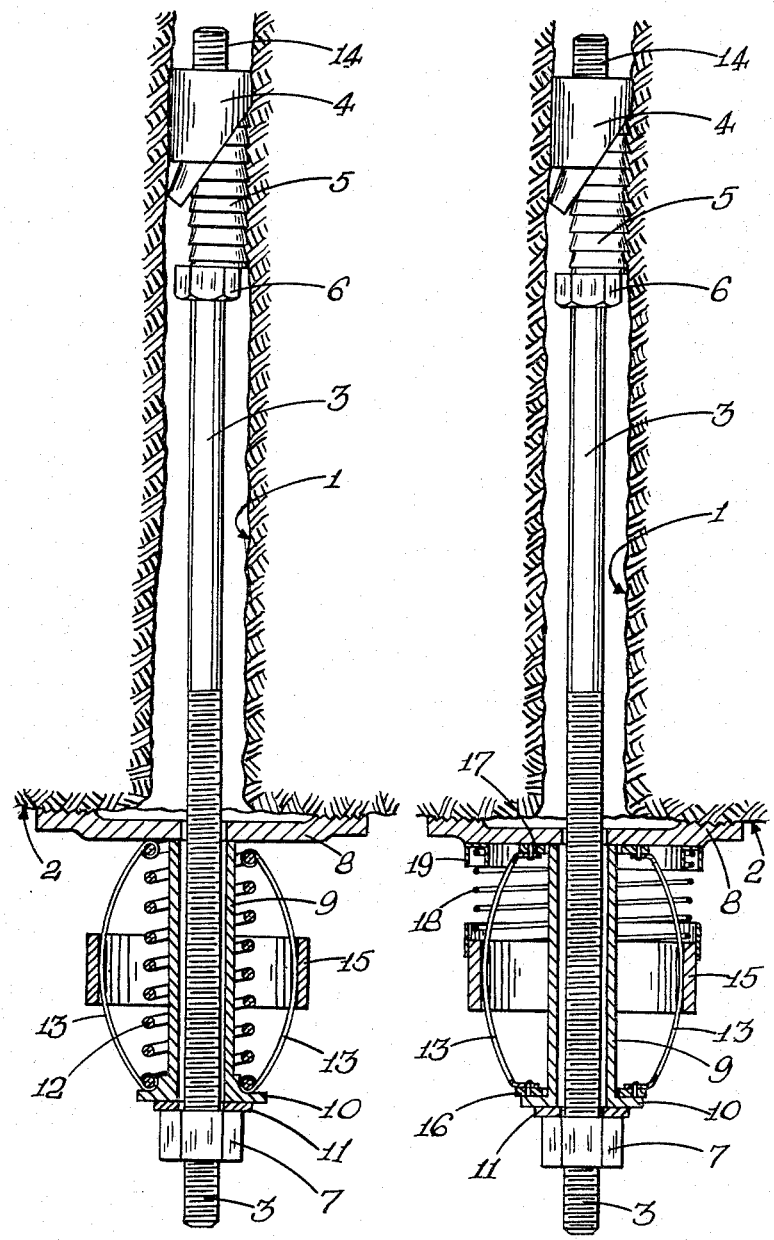
FIGURE 1 is a sectional elevation view showing the manner in which one form of indicating device embodying the principle of the invention is used.
FIGURE 2 is a sectional elevation showing the manner of use of another form of indicating device.
Figure 3:
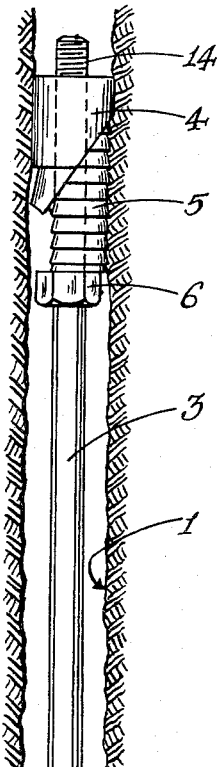
FIGURE 3 is a sectional elevation showing the manner of use of a third form of indicating device.
Figure 4:
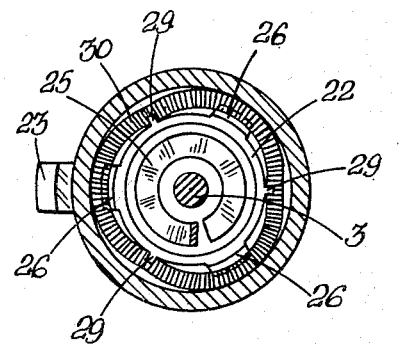
FIGURE 4 is a cross-section on the line IV—IV of FIGURE 3.
Figure 5:
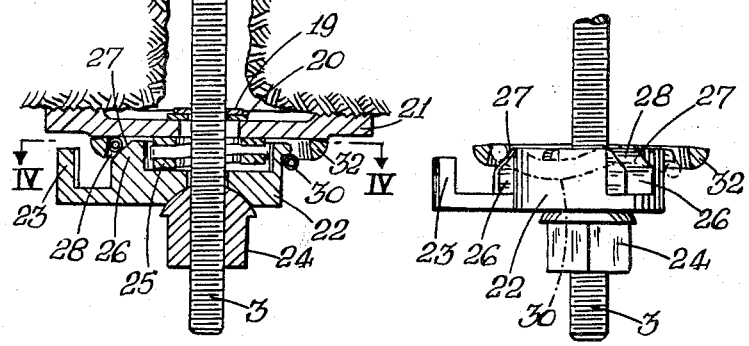
FIGURE 5 is a side elevation of the member 22 of FIGURES 3 and 4 with the garter spring in position thereon and shown in chain-dotted lines.

Referring to FIGURE 1, a socket hole 1 is drilled upwards into a rock face 2. An expansion bolt comprising a shank or stud 3, a pair of conventional complementary wedge-shaped shell members 4 and 5, a nut 6 adjacent the shell member and a second nut 7 on the outer end of the shank, is inserted into the hole 1. 8 is a washer arranged to abut against the rock race 2. A sleeve member 9 having a radial flange 10 at its lower end is mounted on the projecting portion of the stud 3 between the washer 8 and the nut 7. A washer 11 may be interposed between the flange 10 and the nut 7.

A helical spring 12 of greater length than the length of the sleeve member 9 excluding the flange 10 is mounted over the sleeve member 9 between the flange 10 and the washer 8. Strips 13 of spring steel are secured at their respective extremities to the ends of the spring 12. For example, four symmetrically arranged strips may be used.

To effect an initial grip of the shell member 4 and 5 on the walls of the hole 1, the stud 3 is rotated. As soon as the nut 6 reaches the bottom of the thread 14, the shell members will commence their wedging action. Thereafter, torque is applied to the nut 7 by means of a wrench with the result that the stud 3 is drawn bodily outwards to increase the wedging action of the shell members 4 and 5 and so lock the bolt in position. At the same time, the spring 12 is compressed between the flange 10 on the sleeve member 9 and the washer 8. This causes the spring steel strips 13 to bow outwards in a radial direction so as frictionally to engage and grip a warning element in the form of a collar 15 which is slipped over them.

So long as the collar 15 is in place, it is a visual indication that the installation of the bolt is proper. But if the bolt subsequently works loose in the hole 1, the distance between the nut 7 and the rock face 2 will increase with the result that the strips 13 will tend to assume an unbowed position and will release their frictional grip on the collar 15. The latter will then be free to fall under gravity to serve as a visual warning that the bolt is loose and requires tightening.

The device shown in FIGURE 2 is very similar and like parts are indicated by like numerals. The socket hole 1 is however drilled horizontally instead of vertically so that an ejector device for the collar 15 may be employed and its function explained.

In place of the spring 12 of FIGURE 1, there is provided a pair of spaced washers 16 and 17 and the spring steel strips are secured at their respective ends to these washers. Otherwise, the function of the device is the same. Since the hole 1 is drilled horizontally, the collar 15 will not drop clear under gravity when the frictional force exerted by the strips 13 is relaxed. There is therefore provided an annular ejector spring 18 carried in a housing 19 and disposed between the rock face 2 and the inner end of the collar 15. The spring 18 is normally under compression but its strength is such that it will not overcome the frictional force exerted in a radially outward direction by the strips 13. When, however, the frictional force is relaxed, the spring 18 expands and displaces the collar 15 to a warning position.

In the device shown in FIGURES 3, 4 and 5, 19 is a nut, 20 a washer, and 21 an annular disc, all of which are mounted on the bolt shank or stud 3. 22 is a cup-shaped annular member having a laterally extending hook portion 23 and it is mounted on the stud 3 and retained by a nut 24. A compression spring 25 is positioned on the stud 3 between the disc 21 and the member 22 and in its uncompressed state its length is greater than the internal length of the member 22.

The member 22 is provided with three equidistantly spaced lugs 26 chamfered at 27 so as to define between the disc 21 and the member 22 a circumferentially interrupted groove 28 of divergent section. 29 are retaining lugs on the outer periphery of the member 22 disposed between the lugs 26.

A garter spring 30 is hooked over the lugs 29 and arranged so that portions of it lie in the groove 28. 32 is a warning element in the form of a collar.

The number of threads of the nut 19 is materially less than that of the nut 24.

In the first instance, the nut 24 is tightened down towards the nut 19 so as to hold the assembly firmly in place. It is in this condition that the unit is introduced into the hole. Application of torque to the nut 24 will cause the shank 3 to rotate and thereby the shell members 4 and 5 obtain an initial grip. As further torque is applied, a point will be reached when the weaker nut 19 will shear and at this stage the shank 3 will cease to turn with the nut 24.

By means of the nut 24, the stud 3 is now drawn bodily outwards to lock the bolt firmly in the hole 1. At the same time, the spring 25 is compressed axially and the garter spring 30 is squeezed between the disc 21 and the member 22 so that it expands radially and exerts a frictional retaining force on the collar 32.

If the bolt works loose in its socket, the frictional force on the collar 32 will be relaxed with the result that the collar will fall under the action of gravity and remain suspended from the hook 23 to provide a visual warning of looseness of the bolt. Similarly, if the load-carrying capacity of the bolt becomes reduced without the bolt actually working loose, the spring 25 will expand axially and likewise cause the frictional force exerted by the garter spring 30 on the collar 32 to be relaxed.

I claim:

1. A visual warning device for indicating the loose condition of a fastener which is inclusive of a bolt, said device comprising means including a pair of annular members encircling the bolt and movable towards one another upon tightening of the fastener, said annular members defining therebetween a groove of divergent section; an elastic ring which is deformable in a radial direction located in the groove; and a visual warning element surrounding the ring and retained in an engaged position by the ring upon contact with the latter as the ring is radially deformed by being compressed between the annular members, the warning element being released to assume a disengaged warning position upon relative movement of the annular members away from one another which frees the elastic ring from the ring.

2. A device according to claim 1, in which the groove is interrupted.

3. A device according to claim 1, in which at least one of the annular members is cup-shaped and has an internal space, the device further comprising a compression spring mountable coaxially on the bolt and accommodated in said internal space.

4. A device according to claim 1, in which the deformable ring is a garter spring.

5. A device according to claim 1, in which the warning element is a collar.

6. A device according to claim 1, wherein the fastener is an expansion bolt in the form of a stud having a threaded portion with a nut and a locknut on the threaded portion, said nut and locknut being constructed so that one of them will fail prior to the other after a predetermined torque has been applied to the stud via one of the nuts to urge the nuts relatively together.

7. A device according to claim 6, in which the nut and locknut are made of different materials.

8. A device according to claim 6, in which the respective numbers of threads on the nut and locknut are different.

9. Visual warning apparatus for indicating loss of stress in a fastener inclusive of a bolt, said apparatus comprising a sleeve member surrounding the bolt; a flange on the sleeve member constituting a bearing surface; a longitudinal leaf spring in contact with the flange on the sleeve and adapted to be bowed outwards in a radial direction upon tightening of the fastener; and a visual warning element encircling the bolt and supported by the leaf spring only with the latter in bowed condition, to permit the warning element to be released and assume a disengaged warning position in the unbowed condition of the leaf spring in which condition the fastener is loosened.

10. Visual warning apparatus for indicating loss of stress in a fastener inclusive of a bolt, said apparatus comprising: a sleeve member surrounding the bolt; a flange on the sleeve member constituting a bearing surface; a coil spring of greater length than the length of the sleeve member concentrically mounted on the sleeve member with one end abutting the flange; a leaf spring disposed longitudinally outside the coil spring and having extremities secured to the coil spring to cause the leaf spring to be bowed outwards in a radial direction as the coil spring is compressed upon tightening of the fastener; and a visual warning element encircling the bolt and supported by the spring leaf only with the latter in bowed position to permit the warning element to be released and assume a disengaged warning position in the unbowed condition of the leaf spring in which condition the fastener is loosened.

11. Visual warning apparatus for indicating loss of stress in a fastener inclusive of a bolt, said apparatus comprising: a sleeve member surrounding the bolt; a flange on the sleeve member constituting a bearing surface; a cage member comprising a pair of spaced annular rings relatively movable with respect to said bolt, a plurality of leaf springs disposed between the spaced annular rings and connected thereto, said cage member being longer than the sleeve member and being mountable concentrically over the sleeve member with one end abutting the flange and an opposite end adapted for abutting the surface of an element through which the bolt passes; and a visual warning element encircling the bolt and supported by the leaf springs only with the latter radially bowed and the fastener tightened, the warning element being released to assume a disengaged warning position as the springs are relaxed when the fastener is loosened and loses stresses.

References Cited by the Examiner

UNITED STATES PATENTS 2,464,152  3/49  Ralston _____ 73—141
3,072,093  1/63  Lanius _____ 85—62

LOUIS J. CAPOZI, *Primary Examiner.*

EDWARD C. ALLEN, *Examiner.*